(12) United States Patent
Willard

(10) Patent No.: US 6,497,447 B1
(45) Date of Patent: Dec. 24, 2002

(54) CONVERTIBLE HARD TOP FOR VEHICLES

(75) Inventor: Michael T. Willard, Harrison Township, Macomb County, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 09/930,564

(22) Filed: Aug. 15, 2001

(51) Int. Cl.$^7$ .................................................. B60J 7/00
(52) U.S. Cl. .............. 296/108; 296/107.08; 296/107.12
(58) Field of Search ................................. 296/108, 116, 296/117, 115, 112, 107.08, 107.09, 107.15, 107.17

(56) References Cited

U.S. PATENT DOCUMENTS

| | | | |
|---|---|---|---|
| 404,405 A | 6/1889 | Haughey |
| 1,184,734 A | 5/1916 | Freeman |
| 1,784,279 A | 12/1930 | Ellerbeck |
| 1,988,346 A | 1/1935 | Wagner |
| 2,007,873 A | 7/1935 | Paulin |
| 2,076,243 A | 4/1937 | Marshall et al. |
| 2,564,446 A | 8/1951 | Parsons |
| 2,580,486 A | 1/1952 | Vigmostad |
| 2,586,355 A | 5/1952 | Ackermans |
| 2,704,225 A | 3/1955 | Anschuetz et al. |
| 2,714,035 A | 7/1955 | Limberg et al. |
| 2,747,921 A | 5/1956 | Hooverson et al. |
| 2,747,928 A | 5/1956 | Olivier et al. |
| 2,768,024 A | 10/1956 | Spear, Jr. |
| 2,768,025 A | 10/1956 | Spear, Jr. et al. |
| 2,836,457 A | 5/1958 | Berman |
| 2,841,441 A | 7/1958 | Evans |
| 2,856,231 A | 10/1958 | Zeman |
| 2,869,923 A | 1/1959 | Mulichak |
| 2,919,156 A | 12/1959 | Dodge |
| 2,939,742 A | 6/1960 | Dardarian et al. |
| 2,997,337 A | 8/1961 | Day et al. |
| 3,059,962 A | 10/1962 | Harms et al. |
| 3,357,738 A | 12/1967 | Bourlier |
| 3,375,037 A | 3/1968 | Hunt, Jr. |

(List continued on next page.)

FOREIGN PATENT DOCUMENTS

| | | |
|---|---|---|
| BE | 493260 | 5/1950 |
| CH | 650980 | 8/1985 |
| DE | 646381 | 5/1937 |
| DE | 1 505 474 | 7/1969 |
| DE | 3416286 A1 | 10/1984 |
| DE | 3635373 A1 | 4/1988 |
| DE | 3635887 A1 | 5/1988 |
| DE | 3733892 A | 4/1989 |
| DE | 3816060 A | 11/1989 |
| DE | 9108242 | 12/1992 |

(List continued on next page.)

OTHER PUBLICATIONS

Picture of a 1957 Ford Fairlane retractable hardtop convertible, The Detroit News, Apr. 6, 1994.

Viper Pure Performance by Dodge/Auto Editors of Consumer Guide, Publications International, Ltd., pp. 6 and 7, 1993.

(List continued on next page.)

Primary Examiner—D. Glenn Dayoan
Assistant Examiner—Jason Morrow
(74) Attorney, Agent, or Firm—Harness, Dickey & Pierce, P.L.C.

(57) ABSTRACT

A retractable hard-top roof for an automobile vehicle is provided. In another aspect of the present invention, a retraction mechanism couples a rear roof section and a front roof section to a vehicle. A further aspect of the present invention employs a lever arm which is elongated in a generally cross-car direction, driven by an automatic actuator, which has one end coupled to a pivot and an opposite end which can move in a generally vertical direction.

39 Claims, 9 Drawing Sheets

U.S. PATENT DOCUMENTS

| | | |
|---|---|---|
| 3,377,099 A | 4/1968 | Podolan |
| 3,575,464 A | 4/1971 | Himka et al. |
| 3,994,524 A | 11/1976 | Lehmann |
| 4,168,859 A | 9/1979 | Breitschwerdt et al. |
| 4,634,171 A | 1/1987 | McKeag |
| 4,712,828 A | 12/1987 | Albrecht |
| 4,729,592 A | 3/1988 | Tuchiya et al. |
| 4,746,163 A | 5/1988 | Muscat |
| 4,854,634 A | 8/1989 | Shiraishi et al. |
| 4,895,409 A | 1/1990 | Konishi et al. |
| 4,950,022 A | 8/1990 | Pattee |
| 5,033,789 A | 7/1991 | Hayashi et al. |
| 5,067,768 A | 11/1991 | Fischbach |
| 5,078,447 A | 1/1992 | Klein et al. |
| 5,090,764 A | 2/1992 | Kogawa et al. |
| 5,161,852 A | 11/1992 | Alexander et al. |
| 5,195,798 A | 3/1993 | Klein et al. |
| 5,207,474 A | 5/1993 | Licher et al. |
| 5,225,747 A | 7/1993 | Helms et al. |
| 5,429,409 A | 7/1995 | Corder et al. |
| 5,490,709 A | 2/1996 | Rahn |
| 5,520,432 A | 5/1996 | Gmeiner et al. |
| 5,533,777 A | 7/1996 | Kleeman et al. |
| 5,542,735 A | 8/1996 | Furst et al. |
| 5,593,202 A | 1/1997 | Corder et al. |
| 5,743,587 A | 4/1998 | Alexander et al. |
| 5,769,483 A | 6/1998 | Danzl et al. |
| 5,785,375 A | 7/1998 | Alexander et al. |
| 5,806,912 A | 9/1998 | Ramaciotti et al. |
| D406,792 S | 3/1999 | Alexander et al. |
| 5,979,970 A | 11/1999 | Rothe et al. |
| 6,019,416 A | 2/2000 | Beierl |
| 6,030,023 A | 2/2000 | Guillez |
| 6,033,008 A | 3/2000 | Mattila |
| 6,033,009 A | 3/2000 | Ritter et al. |
| 6,033,012 A | 3/2000 | Russke et al. |
| 6,053,560 A | 4/2000 | Rothe |
| D427,138 S | 6/2000 | Alexander et al. |
| 6,168,224 B1 | 1/2001 | Henn et al. |
| 6,217,104 B1 | 4/2001 | Neubrand |
| D442,541 S | 5/2001 | Alexander et al. |
| 6,273,492 B1 | 8/2001 | Schroder et al. |
| 6,299,234 B1 | 10/2001 | Seel et al. |
| 6,312,041 B1 | 11/2001 | Queveau et al. |
| 6,312,042 B1 | 11/2001 | Halbweiss et al. |
| 6,315,349 B1 | 11/2001 | Kinnanen |
| 6,318,793 B1 * | 11/2001 | Rapin et al. ............ 296/107.08 |
| 6,331,029 B1 * | 12/2001 | Schenk ....................... 296/115 |
| D452,675 S | 1/2002 | Alexander et al. |
| 6,347,828 B1 * | 6/2002 | Rapin et al. ............ 296/107.17 |
| 2001/0006297 A1 | 7/2001 | Dintner et al. |
| 2001/0019213 A1 | 9/2001 | Eberle |
| 2001/0020793 A1 | 9/2001 | Eberle |

FOREIGN PATENT DOCUMENTS

| | | |
|---|---|---|
| DE | 4316485 A1 | 11/1994 |
| DE | 43 20 603 A1 | 1/1995 |
| DE | 43 24 708 A1 | 1/1995 |
| DE | 44 38 191 C1 | 7/1995 |
| DE | 44 38 190 C1 | 11/1995 |
| DE | 44 31 656 C1 | 12/1995 |
| DE | 4445580 C1 | 12/1995 |
| DE | 4445941 C1 | 3/1996 |
| DE | 4445944 C1 | 4/1996 |
| DE | 4446483 A1 | 6/1996 |
| DE | 195 17 063 C1 | 6/1996 |
| DE | 44 45 920 A1 | 7/1996 |
| DE | 195 14 022 C1 | 9/1996 |
| DE | 19518071 A1 | 11/1996 |
| DE | 19532568 C1 | 11/1996 |
| DE | 19532567 C1 | 12/1996 |
| EP | 0261379 A2 | 4/1987 |
| EP | 0494366 A2 | 7/1992 |
| FR | 1049026 | 12/1953 |
| GB | 413 467 | 7/1934 |
| GB | 756531 | 9/1956 |
| GB | 978638 | 12/1964 |
| JP | 62-120222 | 6/1987 |
| JP | 2-51925 | 4/1990 |
| JP | 2-144226 | 4/1990 |

OTHER PUBLICATIONS

Automotive Industries, Feb. 1990, p. 75, showing "C & C Intrigue".
Automobil Revue, Sep. 5, 1991, cover page and p. 29 (including English translation).
Car Styling 86, Jan. 1992, cover page and pp. 64–67 (including English translation).
Introducing the Chevy SSR, Aug. 2000, 2 pgs. (and description of corresponding public use).

* cited by examiner

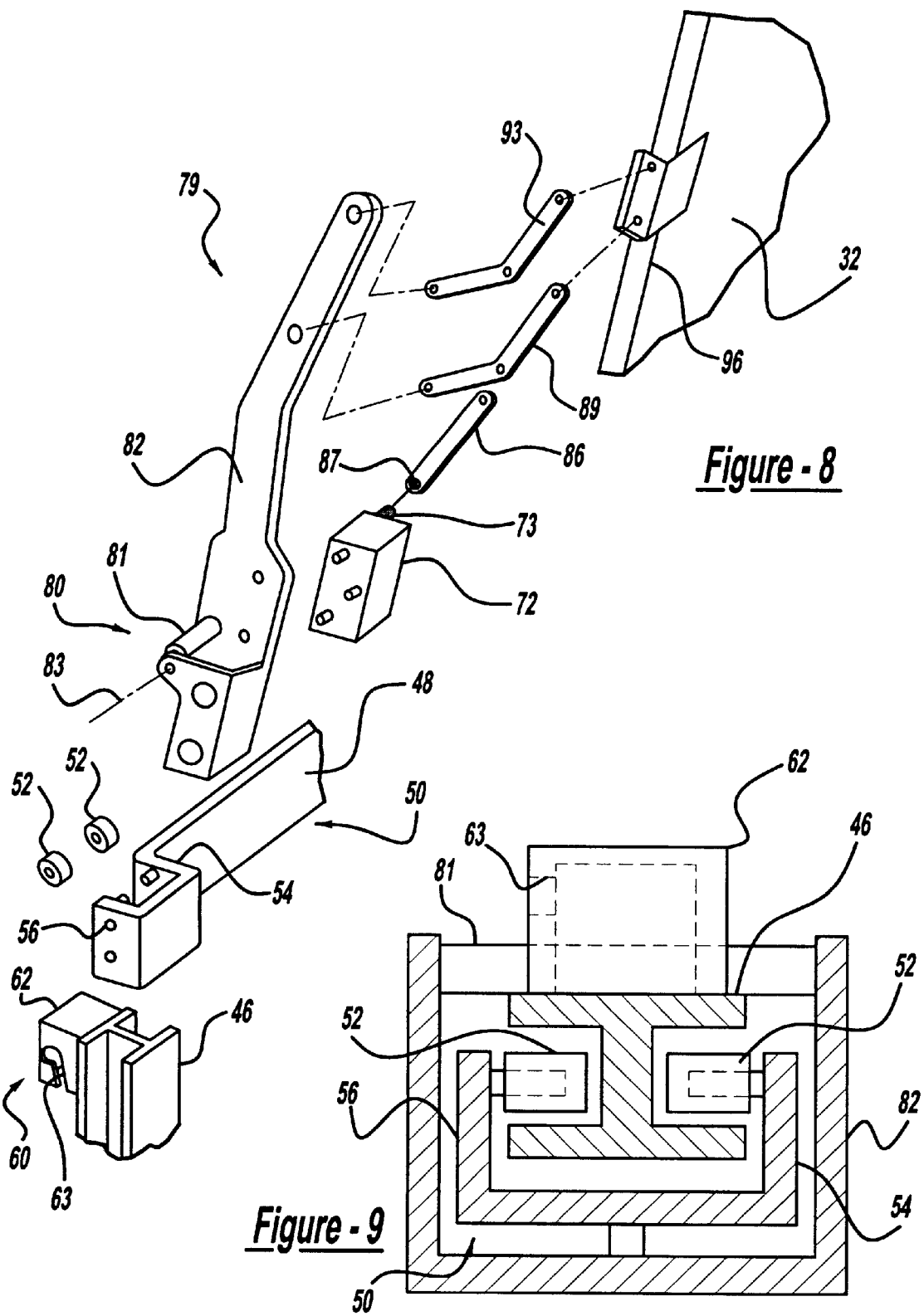

CONVERTIBLE HARD TOP FOR VEHICLES

BACKGROUND AND SUMMARY OF THE INVENTION

This invention relates generally to retractable roof structures for automotive vehicles and more specifically to a multi-part hard top convertible roof.

Automotive vehicles with retractable roofs or tops are commonly referred to as convertibles. Soft top roofs are made of flexible material, which allow the top to be easily folded and stored between open and closed positions. One such example is disclosed in U.S. Pat. No. 5,772,274 entitled "Motorized Drive System For a Convertible Roof of an Automotive Vehicle" which issued to Tokarz on Jun. 30, 1998, and is incorporated by reference herein. Unfortunately, soft top roofs are subject to rapid deterioration and are not good noise and heat insulators.

Manually removeable hard top roofs, on the other hand, possess excellent properties of insulation, water sealing and durability, but are often impractical due to the weight of the tops which makes their manual removal difficult for the average person. Also, they present storage difficulties in the vehicle.

Retractable hard-top roof systems for convertible automotive vehicles are well known. Traditionally, such retractable hard-top roof systems employ a plurality of rigid roof panels which can be retracted for stowage into the trunk of the automotive vehicle. One such system is disclosed in U.S. Pat. No. 2,939,742 entitled "Foldable Vehicle Top" which issued to Dardarian et al. on Jun. 7, 1960. The top is designed for swinging movement between a raised and lowered position. A cable is anchored to pulley members to control the effective length of the cable. With continued use of the device, however, the cable may stretch thus requiring frequent adjustment to the deployment mechanism. Additionally, the top is stored in the trunk thus pre-empting valuable storage space.

Other examples of such systems are disclosed in U.S. Pat. No.: 5,195,798 entitled "Retractable Roof For Vehicles" which issued to Klein et al. on Mar. 23, 1993; U.S. Pat. No. 4,854,634 entitled "Upper Body Structure For A Convertible Vehicle" which issued to Shiraishi et al. on Aug. 8, 1989; U.S. Pat. No. 5,979,970 entitled "Roof Assembly for a Convertible Vehicle" which issued on Nov. 9, 1999 to Rothe et al.; U.S. Pat. No. 5,779,299 entitled "Apparatus for Achieving Automotive Vehicle Roof Insulation" which issued to Purcell, et al. on Jul. 14, 1998; and U.S. Pat. No. 5,785,375 entitled "Retractable Hard-top for an Automotive Vehicle" which issued to Alexander, et al. on Jul. 28, 1998; all of which are incorporated by reference herein. Thus, there is a need for a simple two part convertible roof that is compact, rugged and minimizes the need for adjustment to the retraction mechanism.

In accordance with the preferred embodiment of the present invention, a retractable hard-top roof for an automobile vehicle is provided. In another aspect of the present invention, a retraction mechanism couples a rear roof section and a front roof section to a vehicle. A further aspect of the present invention employs a lever arm which is elongated in a generally cross-car direction, driven by an automatic actuator, which has one end coupled to a pivot and an opposite end which can move in a generally vertical direction.

In still another aspect of the present invention, a method for deploying a hard-top roof from a storage compartment of an automotive vehicle is disclosed. The method includes moving a rigid front roof section and a rigid rear roof section along a generally vertical axis from the storage compartment. Then, angularly rotating the front roof section from the substantially vertical axis to separate from the rear roof section. Next, rotatably deploying the front roof section to an extended position. Then, angularly translating the rear roof section from the substantially vertical axis to move the rear roof section between the front roof section and the body of the vehicle.

The present invention is advantageous over conventional devices since the present invention provides a retractable roof with a front roof portion that is angularly and rotatably extended and is stored so that the front roof portion is nested in the rear roof portion that is simple, compact, rugged and easy to operate. Additionally, the device reduces the need for adjustments to the retraction mechanism by providing a robust hydromechanical deployment unit. These and other features and advantages of the present invention will become apparent from the subsequent description and claims taken in conjunction with the accompanying drawings.

BRIEF DESCRIPTION OF THE DRAWINGS

FIG. 8 is a partial blow-up view of the front roof panel bracket, extension arm, drive link and rotary hydraulic actuator;

FIG. 9 is a cross sectional view, taken along line 9—9 of FIG. 5, of a main guide bracket;

DETAILED DESCRIPTION OF THE PREFERRED EMBODIMENT

Figure 1:
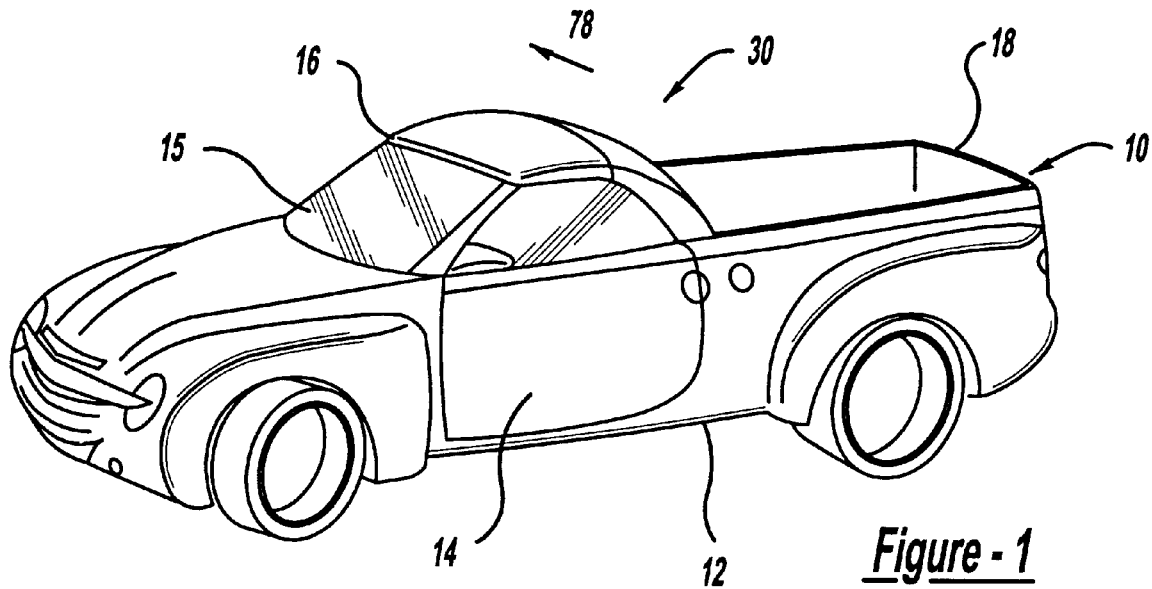
FIG. 1 is a perspective view of the fully deployed hard top roof in an automotive vehicle according to the preferred embodiment of the present invention.
Figure 2:
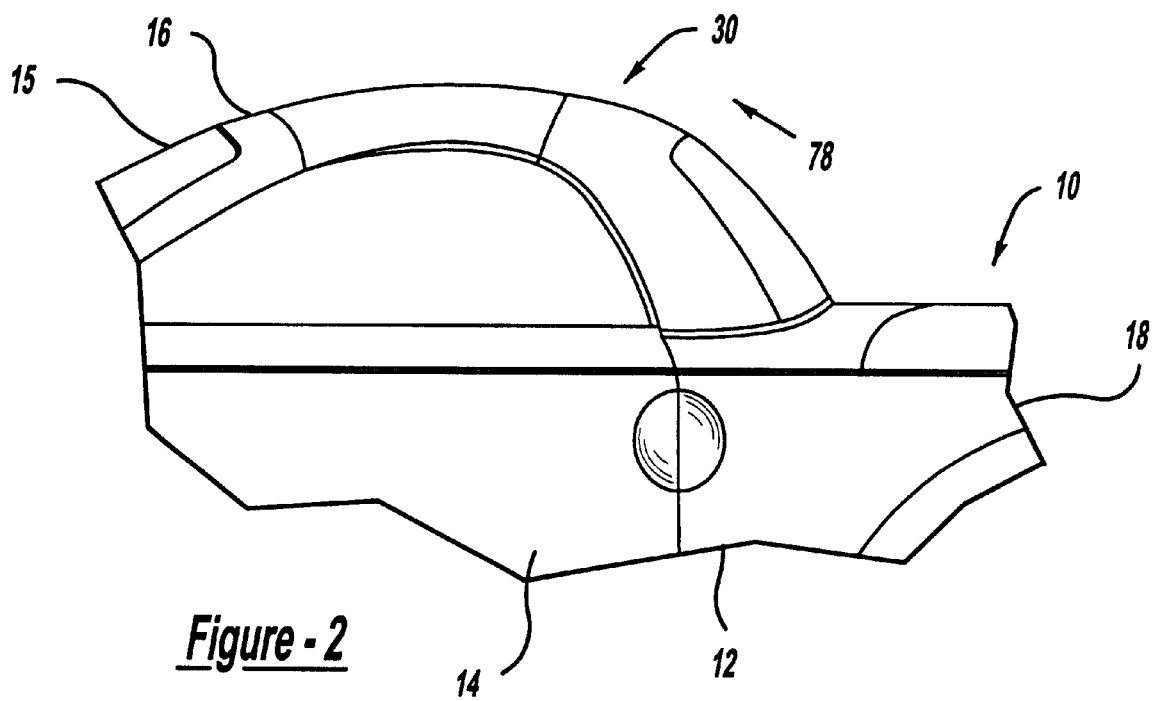
FIG. 2 is a partial side view of the hard top roof shown in a fully deployed position of the present invention in relation to an automotive vehicle.
Figure 3:
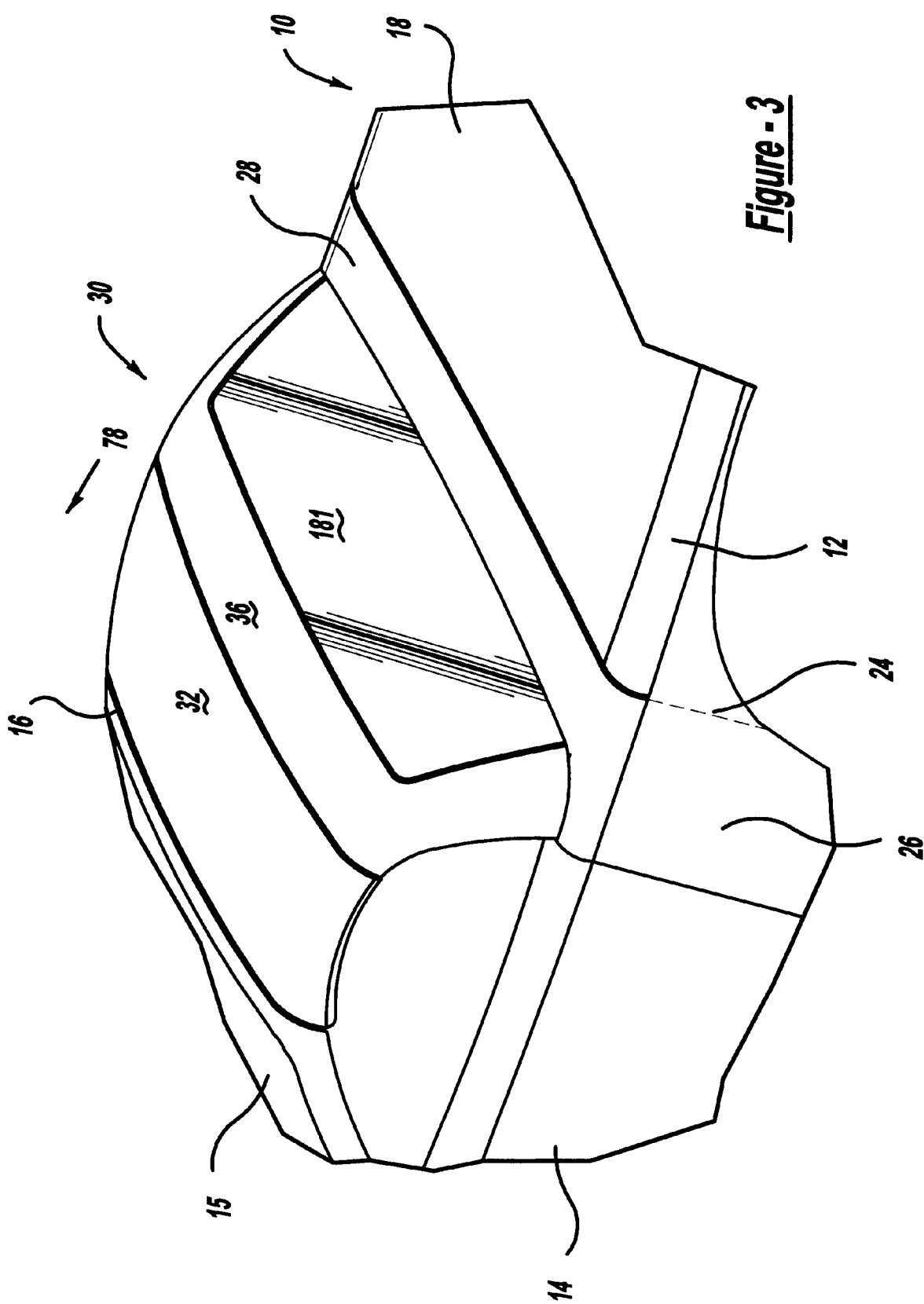
FIG. 3 is a partial perspective view of the hard top roof shown in a fully deployed position of the present invention in relation to an automotive vehicle.
Figure 4:
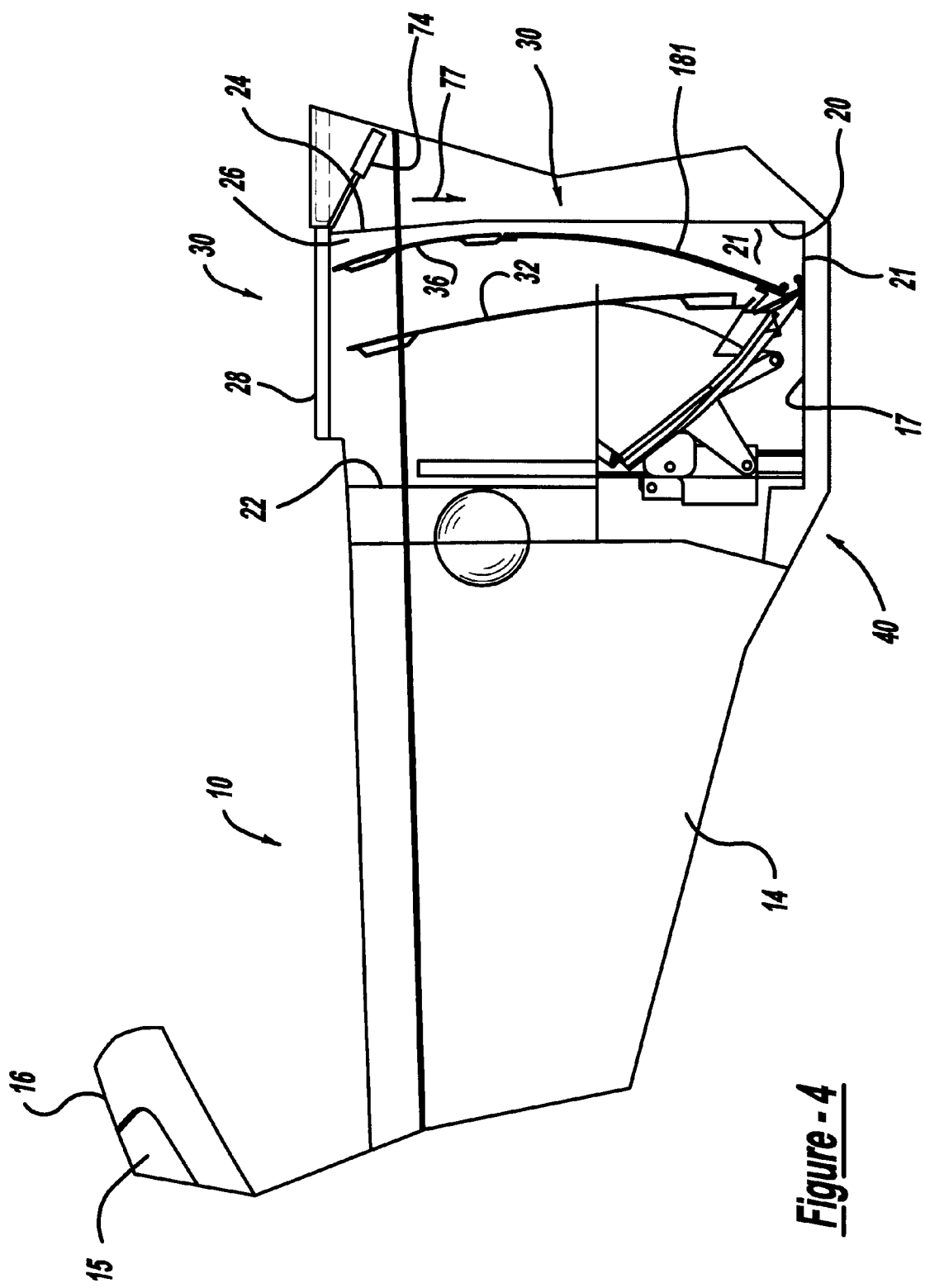
FIG. 4 is a partial side elevational view of the hard top roof shown stowed in the storage compartment in relation to an automotive vehicle.
Figure 5:
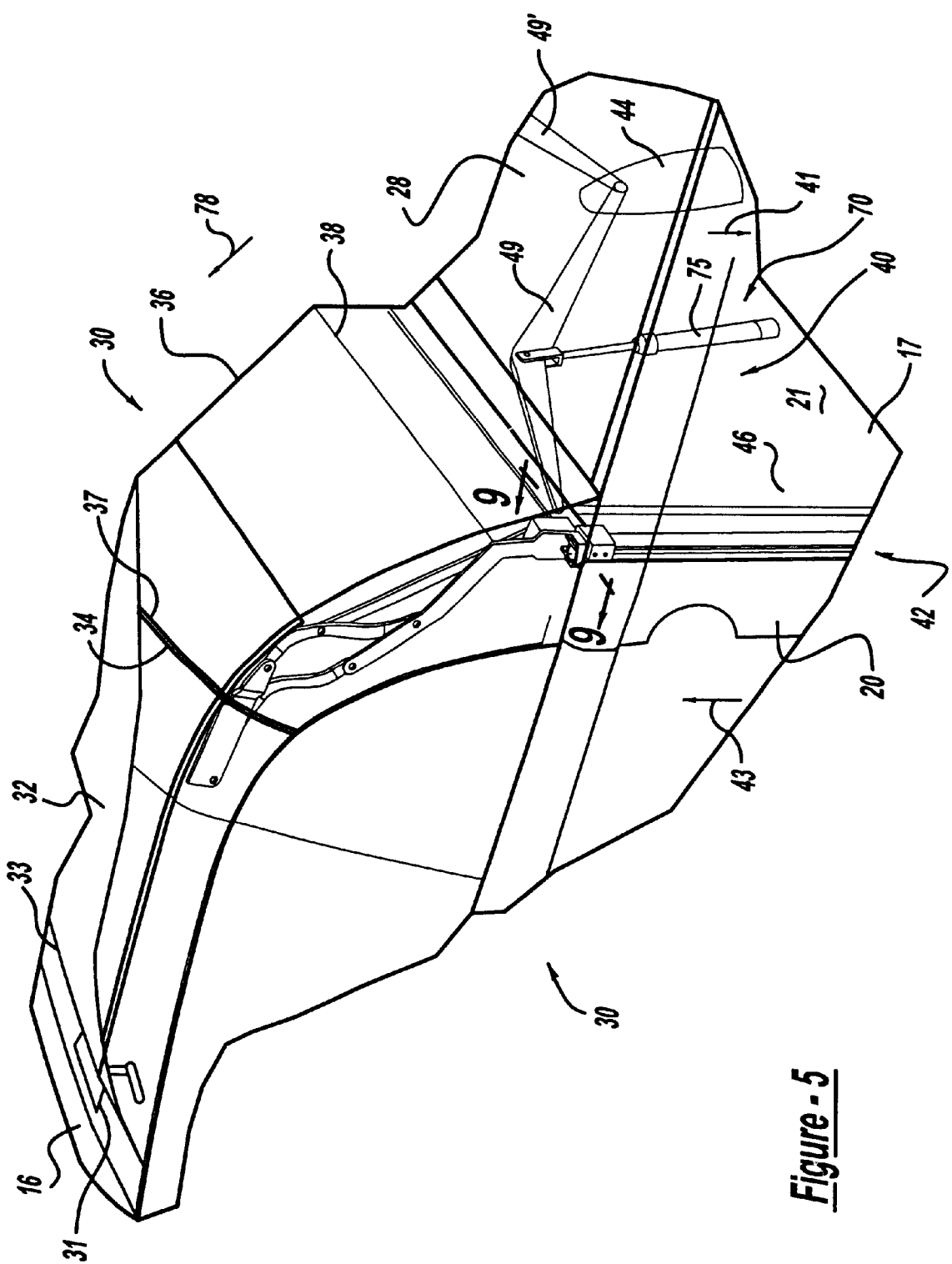
FIG. 5 is a partial perspective view of the deployed hard top roof structural support members.
Figure 6:
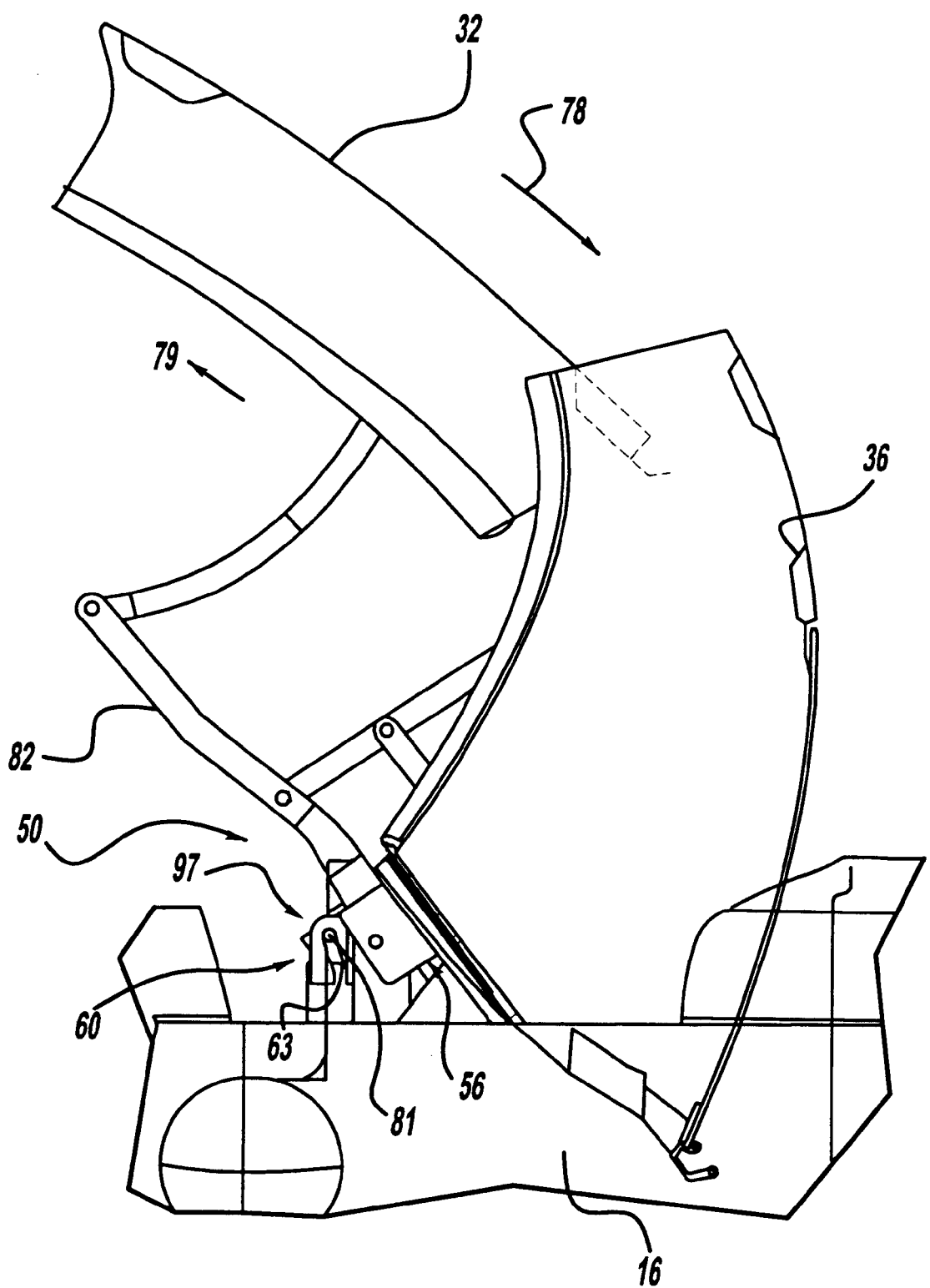
FIG. 6 is a side view of the front and rear roof panel brackets, partially deployed in an automotive vehicle.
Figure 7:
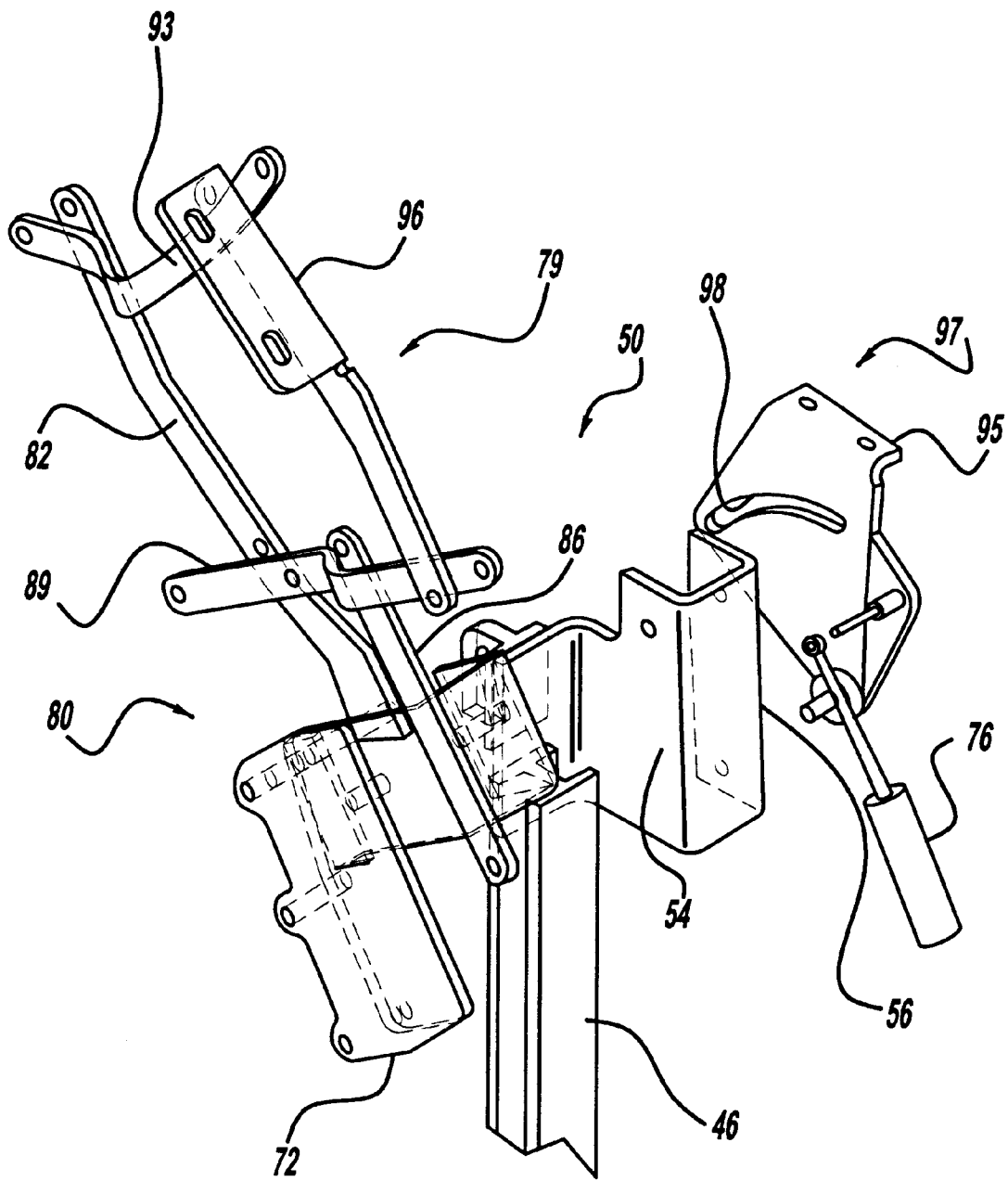
FIG. 7 is a blown-up view of the front and rear roof panel brackets, extension arms and drive links.

The present invention is described for illustration purposes embodied in a hydromechanically actuated rigid two-piece hard top roof for an automotive vehicle. It will be appreciated, however, that the principles of the present invention are readily adaptable to a number of other actuation devices which can retract or deploy any multi-section roof top in a vehicle including a soft top or flexible fabric covered roof where the present actuator is coupled to side rails, or any combined hard and soft top roof.

An automobile vehicle 10 with a retractable hard top roof device 30 according to the preferred embodiment of the present invention is shown in FIGS. 1–4. Vehicle 10 is constructed with a body 12 and retractable hard top roof 30. Body 12 is further divided into a passenger compartment 14 and a miscellaneous storage area or cargo bed 18. Passenger compartment 14 has a windshield 15 and a header 16. Header 16 extends transversely across the top of windshield 15. A roof storage compartment or area 20 is located between passenger compartment 14 and cargo bed 18.

Storage compartment 20 is defined by an interior metal seat back panel 22, an exterior metal cargo panel 24, sides 26 of the vehicle body, a floor 17 of the body and a rigid tonneau cover 28. Seat back panel 22 is a structural member forming a transverse wall behind passenger compartment 20. Exterior cargo panel 24 is also a structural member forming a transverse wall in cargo bed 18.

Tonneau cover 28 is horizontally disposed on a track on body 12 and hydraulically actuated by a first linear actuator 74. Cover 28 provides a closure for storage compartment 20 when hard top roof 30 is in a fully retracted position 77. Hard top roof 30 includes a front roof section 32, a rear roof section 36 and a retraction mechanism 40 (see FIGS. 5–10). Thus, after front and rear roof sections 32, 36 respectively are retracted in a direction 77 and are stored in storage compartment 20, tonneau cover 28 is moved on the track by first linear actuator 74 to enclose roof 30 in compartment 20. And when sections 32, 36 respectively are extended in a direction 78 and moved out of storage compartment 20, tonneau cover 28 is moved on the track by actuator 74 to uncover the storage compartment 20. After roof 30 is deployed, tonneau cover 28 is moved by actuator 74 to slide to a position adjacent rear roof section 36 and to enclose storage compartment 20. Alternately, linear actuators may be hydraulic, pneumatic or electric driven and when actuated, the linear actuators are moved to an extended position and a retracted position. Tonneau cover 28 is described in U.S. Pat. Nos. 5,785,375 and 5,743,587, owned by the assignee of the current application, both of which are incorporated herein by reference.

As best shown in FIGS. 5–10, front roof section 32 is a rigid panel having an outside surface, an inside surface, a forward edge 33 and a rearward edge 34. Front roof section 32 has conventional latching mechanism 31 which is disengageably attachable with header 16 when front and rear roof sections 32, 36 respectively are in a fully extended position 78. Forward edge 33 sealingly engages header 16 when a latching mechanism 31 secures the front roof section 32 to windshield 15.

Rear roof section 36 has an outside or external surface, an inside surface and is further defined by a forward edge 37 and a bottom edge 38. Forward edge 37 sealingly engages rearward edge 34 of front roof panel or section 32 when roof 30 is in a fully extended position condition 78. Bottom edge 38 has lip seals (not shown) which sealingly engage tonneau cover 28 when rear roof section 36 is deployed or extended in position 78.

Retraction mechanism 40 is mounted in a cavity 21 in storage compartment 20. Retraction mechanism 40 includes a guide portion 42 and a hydraulic portion 70. Guide portion 42 has a center post 44 and a pair of spaced apart vertical I-beams 46 which are mounted to floor 17 of compartment 20. Vertical I-beams 46 are positioned just inboard of sides 26 in compartment 20. I-beams 46 are connected to each other by a transversely extending lift arm 48. A pair of lever or pivot arms 49, 49' respectively are provided to move lift arm 48 vertically along I-beams 46. Since pivot arm 49 is a mirror image of pivot arm 49', only arm 49 will be described in detail.

Pivot arm 49 has a first section and a second section connected at an oblique angle to the first section. One end of pivot arm 49 is pinned to the top portion of center post 44. The other end of pivot arm 49 has a pin which slidingly engages slot 47 in lift arm 48 (see FIG. 10). Slot 47 is formed along the transverse axis of arm 48 and adjacent but spaced away from vertical I-beam 46. Slot 47 and pin form a lost motion connection. Pivot arm 49 is moved on vertical I-beam 46 by linear actuation of a pair of second linear actuators 75 of hydraulic portion 70. Each second linear actuator 75 is pivotably fastened at its cylindrical end to floor 17 or alternately to center post 44 and at its actuation end, the cylinder is pivotably connected to pivot arm 49 between first section and a second section of pivot arm 49. When actuated, second actuator 75 linearly extends to move against pivot arm 49. The pin in slot 47 causes lift arm 48 to move on I-beam 46 in one direction 43 away from floor 17 of compartment 20. When retracted, second actuator 75 linearly move lift arm 48 to move in another direction 41 towards floor 17.

Vertical beams 46 are also connected to each other at the top end by a transversely extending cross member to add rigidity to the structure. Additionally, a rack and pinion mechanism 65 is provided to stabilize retraction mechanism 40 during operation. Rack and pinion mechanism 65 is attached to lift arm 48 and includes shaft 66, and two spur gears 67. Two spaced apart columns 68 with toothed profiles 69 are connected at one end to the cross member and floor 17 at the other end. Columns 68 are substantially parallel and inboard of beams 46. Spur gears 67 are attached to shaft 66 and engage the toothed profiles 69. Shaft 66 extends longitudinally along lift arm 48 and is conventionally secured to arm 48. When lift arm 48 is moved along beams 46, the rack and pinion mechanism 65 prevents one end of lift arm 48 from cocking relative to the other end and assures that lift arm 48 does not bind on either end when retraction mechanism 40 is operated to deploy or store retractable hard top roof 30 in storage compartment 20.

Each end of lift arm 48 has main guide brackets 50. One bracket 50 engages one end of the vertical beam 46 and the other bracket 50' engages the other end of the vertical beam 46. Because bracket 50 is a mirror image of bracket 50', only guide bracket 50 will be described.

Main guide bracket 50 is C-shaped in cross-section (see FIG. 9) with one side positioned adjacent a flange of the I-beam 46. The other two parallel sides extend from one side and are parallel to the web of the I-beam 46. A pair of spaced apart rollers 52 are pivotally mounted to each parallel side of the bracket 50. Each roller 52 is mounted on a shaft which is pinned at one end to one parallel side of the bracket 50. This permits the bracket 50 to engage I-beam 46 with rolling contact thereby reducing the friction to move the lift arm 48 on I-beam 46. Bracket 50 has an inboard side 54 and an outboard side 56. Inboard side 52 faces the center post 44 in storage compartment 20. Outboard side 56 faces side 16 of compartment 20 (see FIG. 6).

Front roof section 32 is connected by a front roof linkage mechanism 80 on inboard side 54 and rear roof section 36 is connected by a rear roof linkage mechanism 97 to outboard side 56. Front roof linkage mechanism 80 includes a cam action mechanism 60.

Cam action mechanism 60 includes a contour block 62 which is attached near the top end of the face of I-beam 46 and opposite to the one side of main guide bracket 50. Contour block 62 has a cam slot 63. When main bracket 50 is moved toward the top of vertical beam 46 as, for example, when moved in one direction 43 during deployment of hard top roof 30, a pin or cam follower 81 engages cam slot 63. As this occurs, cam slot 63 causes front panel main arm 82 to pivot to an angle of between about 30 to 50 degrees from a vertical axis and alternately between about 38 to 42 degrees and further alternatively at substantially about 40 degrees. Cam action mechanism 60 functions to assure that front roof section 32 is properly oriented by retraction mechanism 40 prior to being deployed to fully extended position 78. Cam action mechanism 60 also functions to assure that roof section 32 is properly oriented by retraction mechanism 40 after being moved to fully retracted position 77 and to nest front roof section 32 in rear roof section 36 prior to being stored in compartment 20 in retracted position in direction 77. Main bracket 50 is then moved toward the floor 17 as, for example, when moved in another direction 41 during the storage operation.

Front roof linkage mechanism 80 also includes a front panel main arm 82, a drive link 86, a front panel first link 89 and a front panel second link 93 (see FIG. 8). Front panel main arm 82 is pivotably mounted to main guide bracket 50 so that main arm 82 can be rotated to move angularly relative to bracket 50. Front panel main arm 82 is a substantially longitudinal flat member with pin 81 that extends from arm 82 so that pin 81 is adjacent to the face of the flange of I-beam 46 and opposite to the one side of main guide bracket 50. Pivotable mounting axis 83 is formed at pin 81 and connects main arm 82 to main guide bracket 50 to facilitate angular rotation of arm 82 relative to bracket 50. Main arm 82 also has one aperture to receive first link pin to connect one end front panel first link 89 to main arm 82 and another aperture to receive second link pin to connect one end of front panel second link 93 to main arm 82. Front panel bracket 96 is pivotably connected to the other end of front panel first link 89 and the other end of front panel second link 93. Front roof section 32 is connected to front panel bracket 96. Front roof section 32 is connected by a four bar linkage 79 formed by pivotally connecting main arm 82, first link 89, second link 93 and panel bracket 96 together.

Four bar linkage 79 is actuated by a rotary actuator 72 of hydraulic portion 70 which is attached to the front panel main arm 82. Rotary actuator 72 is a hydraulic motor which hydraulically causes a shaft to rotate and provides rotary motion through a pinion gear 73. Hydraulic motors with rotary actuation are available from Power Packer of Germany and Hoerbiger of Germany. Pinion gear 73 rotates when rotary actuator 72 is made operational by a control unit (not shown).

Interior gear teeth 87 at one end in drive link 86 engage. Pinion gear 73 is caused to rotate by hydraulic fluid from a hydraulic pump 71. Pinion gear 73 engages gear teeth 87 and when rotary actuator 72 is operational, pinion gear 73 rotates, thereby causing drive link 86 to rotate and move angularly about its one end. Drive link 86 is pivotally connected to front panel first link 89. When drive link 86 moves angularly, the other end of drive link 86 causes four bar linkage 79 to angularly rotate and move from a retracted position 77 to an extended or deployed condition 78 to deploy front roof section 32.

Rotary actuator 72 is actuated after a potentiometer sensor (or alternately, a limit switch) confirms pivoting of main arm 82 to the desired angle. This assures the proper deployment of front roof section 32 to fully extended position 78.

Rear roof linkage mechanism 97 includes a bracket 95 pivotably connected to outboard side 56 of guide bracket 50.

Bracket 95 is connected to rear roof section 36 and is generally a flat plate with an actuate slot 98. Arcuate slot 98 engages a pin 99 in outboard side 56. When actuated, a third linear actuator 76 presses against bracket 95 causes bracket 95 to pivot relative to guide bracket 50. Pin 99 in slot 98 permits bracket 95 to pivot relative to guide bracket 50 between 0 to 50 degrees and to deploy rear roof section 36 between front roof section 32 and body 12.

Figure 10:
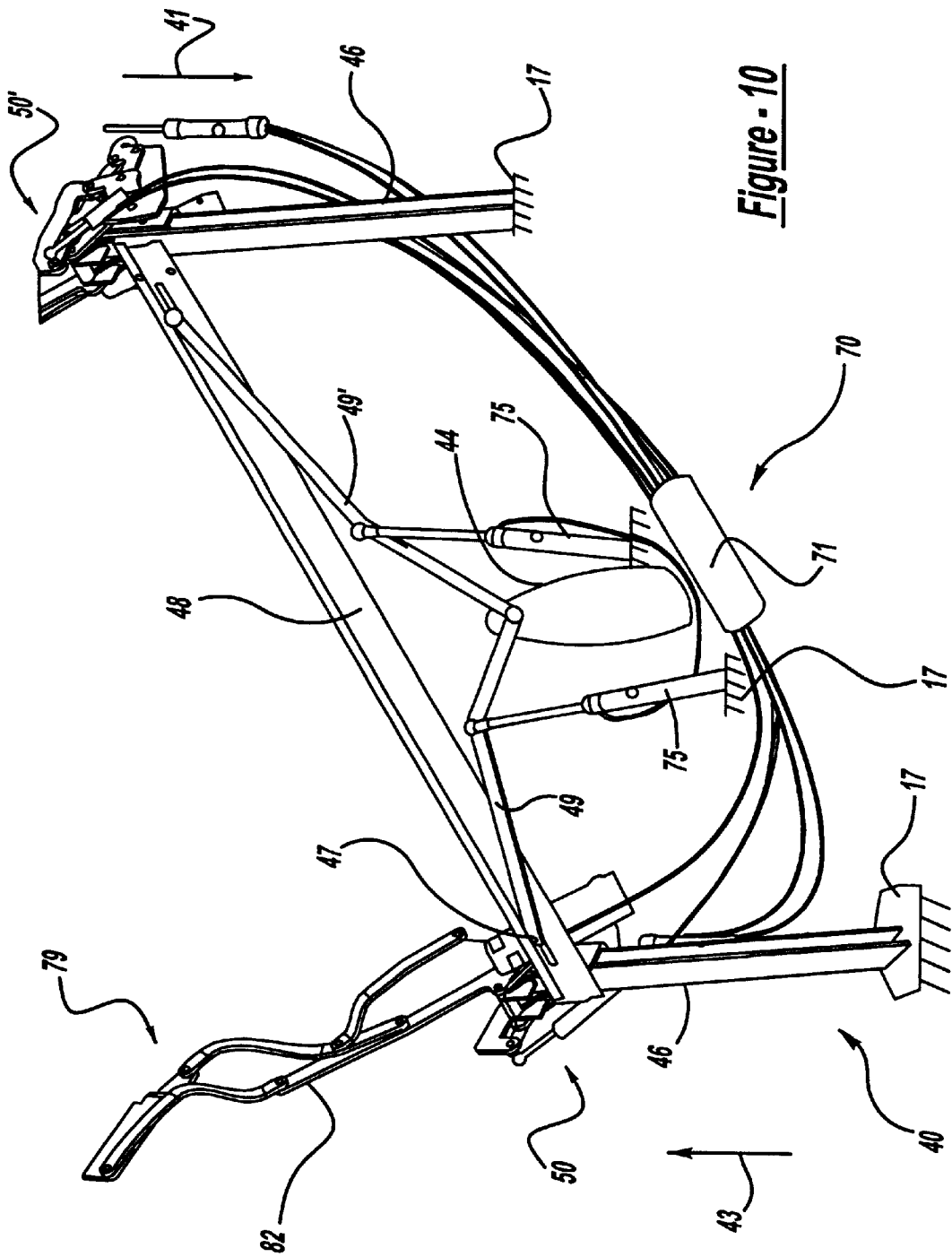
FIG. 10 is a perspective view of the hydraulic system.

FIG. 10 shows hydraulic portion 70 of retraction mechanism 40. Hydraulic portion 70 is driven by an electric motor (not shown) and its operation is controlled by an electronic control device (not shown). Hydraulic portion 70 includes rotary actuator 72, a first linear actuator 74, a second linear actuator 75 and a third linear actuator 76.

As stated earlier, first linear actuator 74 linearly moves tonneau cover 28 along a track, second linear actuator 75 linearly moves pivot arm 49 so that lift arm 48 moves along beams 49, 49' respectively, third linear actuator 76 linearly moves rear roof section 36 and rotary actuator 72 rotates drive link 86 in order to activate front roof linkage mechanism 80 from fully retracted position 77 to fully extended position 78 and to return from fully extended position 78 to fully retracted position 77.

In operation, to deploy retractable hard top roof 30, the operator engages a switch (not shown) in passenger compartment 14. The switch is connected electrically to the electronic control unit, such as a microprocessor, that controls the operation of retraction mechanism 40. The electronic control unit sends a signal to operate an electric motor that is connected to hydraulic pump 71. Hydraulic pump 71 is in fluid connection with rotary actuator 72, first linear actuator 74, second linear actuator 75 and third linear actuator 76. Additionally, the electronic control unit controls the operation of actuators 72, 74, 75 and 76.

First linear actuator 74 is actuated by the electronic control unit to move tonneau cover 28 horizontally along a track on cargo bed 18 to open storage compartment 20. A potentiometer sensor senses that tonneau cover 28 has fully traveled along the track and has opened compartment 20. The sensor sends an electrical signal to the electronic control unit confirming that compartment 20 is open. Then, the control unit deactivates first linear actuator 74 and activates second linear actuator 75.

When activated, second linear actuator 75 moves pivot arms 49, 49' respectively to move lift arm 48 vertically along I-beams 46 in one direction 43 to move lift arm 48 from floor 17 to the top end of beams 46. A potentiometer sensor senses that lift arm 48 has traveled to the top end of beams 46 and that front panel main arm 82 has pivoted angularly to unnest the front roof section 32 from rear roof section 36 so as to provide clearance between front roof section 32 and rear roof section 36. The sensor sends an electrical signal to the electronic control unit confirming that front roof section 32 is moved angularly relative to rear roof section 36. Then, electronic control unit deactivates second linear actuator and activates rotary actuator 72.

Rotary actuator 72 is actuated by the electronic control unit to rotate pinion gear 73 and engage internal gears 87 of drive link 86. Drive link 86 causes four bar linkage 79 to move from a retracted position 77 to an extended condition 78 to deploy front roof section 32. A potentiometer sensor confirms deployment of front roof section 32 to fully extended position 78 and sends an electrical signal to the electronic control unit. Upon receiving the signal from the sensor, the electronic control unit deactivates the rotary actuator 72 and activates third linear actuator 76.

When activated, third linear actuator 76 moves bracket 95 to rotate relative to guide bracket 50 and move rear roof section 36 adjacent front roof section 32. A potentiometer sensor confirms that rear roof section 36 has been deployed and sends an electrical signal to the electronic control unit. Then, the electronic control unit deactivates the third linear actuator 76 and reactivates first linear actuator 74.

When reactivated, first linear actuator 74 moves tonneau cover 28 from an open position to a closed position. In the closed position, tonneau cover 28 moves adjacent to the deployed rear roof section 36, sealingly engaged by the lip seals and closes compartment 20. A potentiometer sensor detects that the tonneau cover 28 has closed storage compartment 20 and sends an electrical signal to the electronic control unit. Then, the electronic control unit deactivates first linear actuator 74 and causes latching mechanism 31 to engage front roof section 32 to header 16 to deploy and lock roof 30 to vehicle 10.

To store retractable hard top roof 30 from its deployed position, the operator engages the switch in passenger compartment 14 and the electronic control unit reverses the above sequence of events until retractable hard top roof 30 is stored in storage compartment 20 and tonneau cover 28 encloses compartment 20.

Figure 11:
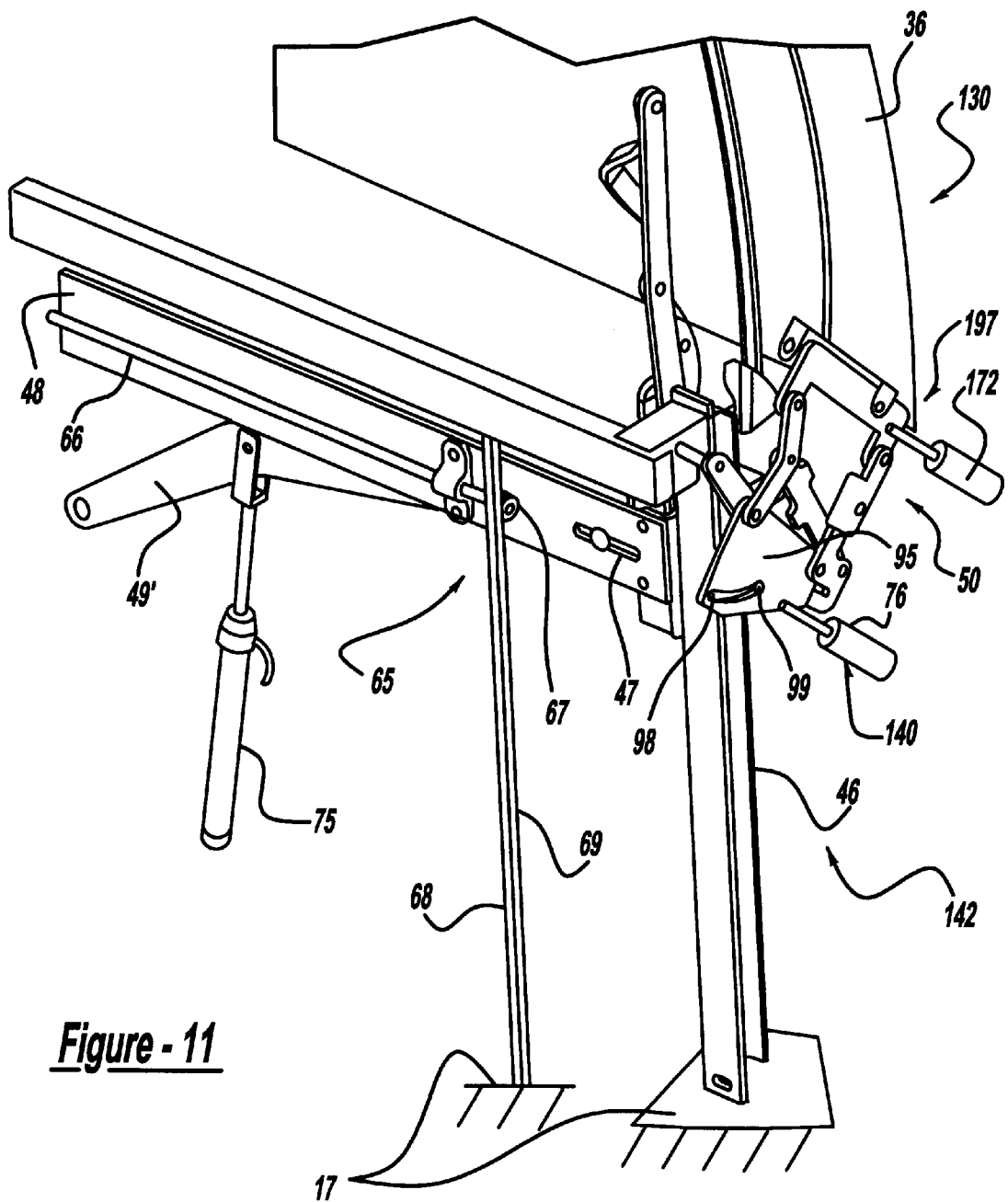
FIG. 11 is an alternate embodiment of the present invention.

FIG. 11 shows an alternate embodiment of a retractable hard top roof device 130 of the present invention. Where the elements are the same as in the preferred embodiment, those numerals will be the same. Retractable hard top roof device 130 includes front roof section 32, rear roof section 36 and a retraction mechanism 140. Retraction mechanism 140 has a guide portion 142 and hydraulic portion 70.

Guide portion 142 includes center post 44, I-beams 46, lift arm 48, pivot arms 49, 49' respectively, guide brackets 50, 50' respectively, front roof linkage mechanism 80 and a rear roof linkage mechanism 197. Rear roof linkage mechanism 197 is a four bar linkage assembly 199 which is similar to four bar linkage 79. Assembly 199 is connected to outboard side 56 of guide bracket 50. Four bar linkage assembly 199 has four links which are actuated by fourth linear actuator 76 to angularly move and rotate rear roof section 36 adjacent front roof section 32. Alternatively, assembly 199 is rotated by a rotary actuator 172 similarly to four bar linkage assembly 79. In all other respects, the alternate embodiment of retractable hard top roof 130 is the same as in the preferred embodiment.

While it is apparent that the embodiments of the invention disclosed are well calculated to provide the advantages and features above stated, it will be appreciated that the invention is susceptible to modification, variation, and change without departing from the proper scope or fair meaning of the subjoined claims. For example, the device may be mounted to the sides of storage compartment on tracks instead of separate I-beams 46. The device may also include extra roof sections or additional members to the retraction mechanism. A soft top roof can also be used with the present device. While the device was described with hydraulic actuators, an electric motor actuator may alternately be employed to deploy retractable roof 30 or any another suitable power transfer mechanism. Furthermore, the hard top roof can alternately be stored in a miscellaneous storage area such as a trunk of a conventional sedan or coupe rather than in a roof storage compartment of the presently disclosed pickup truck. Other materials and dimensions can be substituted for those disclosed. It is intended by the following claims to cover these and any other departures from the disclosed embodiments which fall within the true spirit of this invention.

The invention claimed is:

1. An automotive vehicle apparatus comprising:
   a convertible roof being moveable in at least a fore-and-aft direction between a raised position and a retracted position;
   a back window attached to and always moving with at least a portion of the convertible roof; and
   a retraction mechanism coupled to the convertible roof to operably drive the roof between the positions, the retraction mechanism including at least one lever arm and an automatic actuator, the lever arm being elongated in a substantially cross-car direction substantially perpendicular to the fore-and-aft direction, a first end of the lever arm operably moving in a substantially vertical direction in response to actuation of the actuator.

2. The apparatus of claim 1 further comprising a substantially stationary pivot, and a second end of the lever arm coupled to the pivot, the actuator being located substantially between the ends of the lever arm.

3. The apparatus of claim 2 wherein the retraction mechanism includes a second lever arm and a second automatic actuator, the second lever arm being elongated in the substantially cross-car direction and having a first end moveable in the substantially vertical direction in response to actuation of the second actuator.

4. The apparatus of claim 3 further comprising substantially vertical and stationary members coupled to the convertible roof to allow sliding movement of the roof relative to the vertical members at least partially in response to movement of the lever arms, wherein the first ends of the lever arms are outboard ends.

5. The apparatus of claim 1 wherein the convertible roof is a retractable hard top roof.

6. The apparatus of claim 5 wherein the convertible roof includes at least two substantially rigid roof sections.

7. An automotive vehicle apparatus comprising:
   a convertible roof being moveable in at least a fore-and-aft direction between a raised position and a retracted position, the convertible roof including at least two substantially rigid hard top roof sections; and
   a retraction mechanism coupled to the convertible roof to operably drive the roof between the positions, the retraction mechanism including at least one lever arm and an automatic actuator, the lever arm being elongated in a substantially cross-car direction substantially perpendicular to the fore-and-aft direction, a first end of the lever arm operably moving in a substantially vertical direction in response to actuation of the actuator;
   wherein the roof sections are stored in a substantially vertical orientation.

8. The apparatus of claim 6 wherein external surfaces of the roof sections are stored in a rearwardly facing direction.

9. The apparatus of claim 5 further comprising a miscellaneous storage area and a roof storage area, the convertible roof being stored in the roof storage area without obstructing access to the miscellaneous storage area.

10. The apparatus of claim 1 further comprising a four-bar linkage coupled to a front section of the convertible roof, and a rear roof linkage coupled to a rear section of the convertible roof.

11. The apparatus of claim 10 further comprising an automatically powered rotary actuator operably driving the four-bar linkage.

12. The apparatus of claim 1 further comprising a rack and pinion mechanism operably assisting in guiding the vertical movement of the lever arm.

13. The apparatus of claim 1 further comprising:
a substantially vertical and stationary guide;
a member moveably coupled to the guide, movement of the lever arm operably causing the member to upwardly move along the guide;
a cam coupled to one of the guide and the member;
a cam follower operably engaging the cam when the member is near the top of the guide; and
the cam causing a forward portion of the convertible roof to rotate relative to a moveable rearward portion of the convertible roof.

14. The apparatus of claim 13 wherein the forward and rearward portions of the convertible roof are separate hard top roof sections.

15. A method of operating a hard top convertible roof with a guide, at least one linkage mechanism and at least one actuator, the roof having at least substantially rigid front and rear hard top roof sections, the method comprising:
(a) lowering the linkage mechanism relative to the guide by automatic actuation of at least the actuator;
(b) retracting the substantially rigid hard top roof sections;
(c) rotating one roof section relative to the other roof section by a camming action during retraction of the roof sections; and
(d) moving at least portions of the roof sections closer together through the camming section action to reduce storage space needed for the roof sections when retracted.

16. The method of claim 15 further comprising pivoting an elongated arm about a pivot axis located adjacent a cross-car centerline in order to retract the convertible roof.

17. The method of claim 16 further comprising energizing a fluid powered actuator to drive the arm.

18. The method of claim 15 further comprising storing the roof sections in a substantially parallel and substantially vertical orientation with their external surfaces facing substantially the same direction.

19. A method of operating a hard top convertible roof of an automotive vehicle with a retraction mechanism, the roof having a back window, the method comprising:
(a) automatically energizing the retraction mechanism to move at least a portion of a cross-car extending lever arm along a substantially vertical plane from a first position to a second and offset position;
(b) retracting the hard top convertible roof from a raised position to a retracted position in response to step (a);
(c) always moving the back window with the hard top convertible roof; and
(d) orienting the majority of the hard top convertible roof in a substantially vertical direction when in the retracted position.

20. The method of claim 19 further comprising:
(a) energizing a first actuator;
(b) rotating the lever arm coupled to and in response to the energization of the first actuator;
(c) simultaneously energizing a second actuator; and
(d) rotating a second lever arm coupled to and in response to the energization of the second actuator.

21. The method of claim 20 further comprising rotating at least one of the lever arms about a fulcrum coupled to a substantially vertically extending post.

22. The method of claim 19 further comprising:
(a) retracting a front roof section of the hard top convertible roof to a substantially vertical position when fully retracted; and
(b) retracting a rear roof section of the hard top convertible roof to a substantially vertical position behind the front roof section in the vehicle when fully retracted.

23. The method of claim 19 further comprising:
(a) camming a first roof section of the hard top convertible roof relative to a second roof section of the hard top convertible roof during their retraction; and
(b) moving the roof sections closer together through the camming to reduce storage space needed in the vehicle for the roof sections when fully retracted.

24. An automotive vehicle apparatus comprising:
a convertible roof having at least a front roof section and a rear roof section, at least one of the roof sections having a rigid outside surface;
a back window secured to and always moving with the rear roof section;
a post having a fulcrum, the post extending in a substantially vertical direction; and
at least one lever arm operably rotating about the fulcrum along a substantially vertical and cross-car oriented plane;
actuation of the lever arm operably causing movement of at least one of the roof sections.

25. The apparatus of claim 24 wherein actuation of the lever arm operably moves both of the roof sections.

26. The apparatus of claim 24 further comprising a second lever arm, wherein both of the lever arms simultaneously rotate about the fulcrum.

27. The apparatus of claim 24 further comprising substantially vertical and stationary members coupled to the convertible roof to allow sliding movement of the roof relative to the members at least partially in response to movement of the lever arm.

28. The apparatus of claim 24 wherein the front and rear roof sections are stored in a substantially vertical orientation.

29. The apparatus of claim 24 further comprising at least a fourbar linkage coupling the front roof section to the rear roof section.

30. The apparatus of claim 24 further comprising a rack and pinion mechanism operably assisting in guiding the vertical movement of the lever arm.

31. The apparatus of claim 24 further comprising:
a substantially vertical and stationary guide;
a member movably coupled to the guide, movement of the lever arm operably causing the member to upwardly move along the guide;
a cam coupled to one of the guide and the member; and
a cam follower operably engaging the cam when the member is near the top of the guide;
the cam causing a forward portion of the convertible roof to rotate relative to a movable rearward portion of the convertible roof.

32. An automotive vehicle apparatus comprising:
a convertible roof section having at least a front hard top roof section and a rear hard top roof section;
a substantially vertical and stationary guide;
an automatic actuator;
a member movably coupled to the guide, energization of the actuator operably causing the member to move upwardly along the guide;
a cam coupled to one of the guide and the member; and
a cam follower operably engaging the cam when the member is near the top of the guide;

the cam causing one of the front and rear roof sections to rotate relative to the other when the front and rear roof sections are both adjacent a roof storage area.

33. The apparatus of claim 32 further comprising a rack and pinion mechanism coupled to the convertible roof.

34. The apparatus of claim 32 further comprising a back window always moving with the rear roof section.

35. The apparatus of claim 32 wherein the front and rear roof sections are stored in a substantially vertical orientation.

36. The apparatus of claim 32 further comprising at least a four-bar linkage coupling the front roof section to the rear roof section.

37. The apparatus of claim 32 wherein external surfaces of the roof sections are stored in a rearwardly facing direction.

38. The apparatus of claim 32 further comprising a miscellaneous storage area and a roof storage area, the convertible roof being stored in the roof storage area without obstructing access to the miscellaneous storage area.

39. The apparatus of claim 32 wherein the cam follower is automatically disengageable from the cam when the front roof section is advanced toward its raised position.

* * * * *

UNITED STATES PATENT AND TRADEMARK OFFICE
CERTIFICATE OF CORRECTION

PATENT NO.    : 6,497,447 B1  
DATED         : December 24, 2002  
INVENTOR(S)   : Michael T. Willard It is certified that error appears in the above-identified patent and that said Letters Patent is hereby corrected as shown below:

<u>Title page,</u>  
Item [56], References Cited, U.S. PATENT DOCUMENTS, "2,586,355" should be -- 2,596,355 --.

<u>Column 4,</u>  
Line 19, "move" should be -- moves --.  
Line 55, "52" should be -- 54 --.

<u>Column 10,</u>  
Line 39, "fourbar" should be -- four-bar --.

Signed and Sealed this

Twelfth Day of August, 2003

JAMES E. ROGAN  
*Director of the United States Patent and Trademark Office*